US005695878A

United States Patent [19]

Badesha et al.

[11] Patent Number: 5,695,878

[45] Date of Patent: Dec. 9, 1997

[54] FLUOROELASTOMER MEMBERS

[75] Inventors: Santokh S. Badesha, Pittsford; George J. Heeks, Rochester; Arnold W. Henry, Pittsford; Che Chung Chow, Penfield; Roger N. Ciccarelli; Joseph R. Weber, both of Rochester, all of N.Y.

[73] Assignee: Xerox Corporation, Stamford, Conn.

[21] Appl. No.: 625,566

[22] Filed: Mar. 28, 1996

[51] Int. Cl.[6] .......... B32B 27/00

[52] U.S. Cl. .......... 428/334; 428/422; 428/447; 428/450; 428/448

[58] Field of Search .......... 430/98, 99, 124; 428/447, 448, 450, 461, 463, 469, 421, 422, 334

[56] References Cited

U.S. PATENT DOCUMENTS

| | | | |
|---|---|---|---|
| 3,590,000 | 6/1971 | Palermite | 252/62.1 |
| 4,199,626 | 4/1980 | Stryjewski et al. | 428/422 |
| 4,853,737 | 8/1989 | Hartley et al. | 355/289 |
| 5,166,031 | 11/1992 | Bodesha et al. | 430/124 |
| 5,217,837 | 6/1993 | Hennry et al. | 430/124 |
| 5,281,506 | 1/1994 | Bodesha et al. | 430/124 |
| 5,332,641 | 7/1994 | Finn et al. | 430/124 |
| 5,337,129 | 8/1994 | Bodesha | 355/275 |
| 5,340,679 | 8/1994 | Bodesha et al. | 430/126 |
| 5,366,772 | 11/1994 | Bodesha et al. | 428/35.8 |
| 5,370,931 | 12/1994 | Fratangelo et al. | 428/334 |
| 5,456,987 | 10/1995 | Bodesha | 428/421 |
| 5,599,631 | 2/1997 | Chen et al. | 428/422 |

*Primary Examiner*—Erma Cameron
*Attorney, Agent, or Firm*—Annette L. Bade

[57] ABSTRACT

Fluoroelastomer surfaces for fuser members and a method for fusing thermoplastic resin toner images to a substrate using fuser surfaces, including a method for forming these surfaces which includes dissolving a fluoroelastomer; adding an amino silane to form a resulting homogeneous fluoroelastomer solution; and subsequently providing a layer of the homogeneous fluoroelastomer solution to the supporting substrate.

17 Claims, 1 Drawing Sheet

FLUOROELASTOMER MEMBERS

CROSS REFERENCE TO RELATED APPLICATIONS

Attention is directed to the following copending applications assigned to the assignee of the present application. Attorney Docket Number D/94320 U.S. application Ser. No. 08/625,563 filed Mar. 28, 1996, entitled, "Volume Grafted Elastomer Surfaces and Methods Thereof," Attorney Docket No. D/94319 U.S. application Ser. No. 08/623,292 filed Mar. 28, 1996, entitled, "Fluoroelastomer Surfaces and Methods Thereof;" Attorney Docket No. D/94318 U.S. application Ser. No. 08/623,290 filed Mar. 28,1996, entitled, "Fluoroelastomer Surfaces and Methods Thereof;" and Attorney Docket No. D/49356Q U.S. application Ser. No. 08/623,273 filed Mar. 28, 1996, entitled, "Fluoroelastomer Members," the disclosures of which are incorporated herein by reference in their entirety.

BACKGROUND OF THE INVENTION

The present invention relates to elastomer surfaces and a process for providing elastomer surfaces, and more specifically to a fluoroelastomer, hydrofluoroelastomer, VITON® fluoroelastomer, or a copolymer thereof, on a supporting substrate. The resulting surfaces are useful as surfaces for components in electrostatographic processes, especially xerographic processes, including the surfaces of fuser system members, including donor rolls, pressure rolls, fuser rolls, toner transfer belts or roller surfaces and the like. In addition, the present invention, in embodiments, relates to a method for fusing thermoplastic resin toner images to a substrate. In embodiments, the present invention allows for a decrease in unit manufacturing costs by dispensing with the need for additional coupling and crosslinking agents, and avoiding the use of the basic metal oxides, during the curing process in the overall process for providing a fluoroelastomer surface. Further, with the present process, the roll milling and/or the final ball milling steps are eliminated, resulting in decreased time that is required for curing and further, resulting in a decrease in cost. The resulting fluoroelastomer surface has sufficient toughness and excellent chemical, physical and thermal stability when compared to surfaces cured using known methods. In addition, the resulting fluoroelastomer surface when applied to fuser members, in embodiments, provides a fuser member which is less susceptible to hot offset.

In a typical electrostatographic reproducing apparatus, a light image of an original to be copied is recorded in the form of an electrostatic latent image upon a photosensitive member and the latent image is subsequently rendered visible by the application of electroscopic thermoplastic resin and pigment particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner causes the toner to be firmly bonded to the support.

Typically, the thermoplastic resin particles are fused to the substrate by heating to a temperature of between about 90° C. to about 200° C. or higher depending upon the softening range of the particular resin used in the toner. It is undesirable, however, to increase the temperature of the substrate substantially higher than about 250° C. because of the tendency of the substrate to discolor or convert into a fire, at such elevated temperatures, particularly when the substrate is paper.

Several approaches to thermal fusing of electroscopic toner images have been described. These methods include providing the application of heat and pressure substantially concurrently by various means, such as a roll pair maintained in pressure contact, a belt member in pressure contact with a roll, and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affects the fusing of the toner image onto the support. It is important in the fusing process that no offset of the toner particles from the support to the fuser member take place during normal operations. Toner particles that offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

Fusing systems using fluoroelastomers as surfaces for fuser members are described in U.S. Pat. No. 4,264,181 to Lentz et al., U.S. Pat. No. 4,257,699 to Lentz, and U.S. Pat. No. 4,272,179 to Seanor, all commonly assigned to the assignee of the present invention. The disclosures of each of these patents are hereby incorporated by reference herein in their entirety.

U.S. Pat. No. 5,017,432 describes a fusing surface layer obtained from a specific fluoroelastomer, poly (vinylidenefluoride-hexafluoropropylene-tetrafluoroethylene) where the vinylidenefluoride is present in an amount of less than 40 weight percent. This patent further discloses curing the fluoroelastomer with VITON® Curative No. 50 (VC-50) available from E. I. Du Pont de Nemours, Inc. which is soluble in a solvent solution of the polymer at low base levels and is readily available at the reactive sites for crosslinking. This patent also discloses use of a metal oxide (such as cupric oxide) in addition to VC-50 for curing.

U.S. Pat. No. 5,061,965 to Ferguson et at., the disclosure of which is hereby incorporated by reference in its entirety, discloses an elastomer release agent donor layer comprising poly(vinylidenefluoride-hexafluoropropylene-tetrafluoroethylene) where the vinylidenefluoride is present in an amount less than 40 weight percent and a metal oxide. The release agent donor layer is cured with a nucleophilic curing agent in the presence of an inorganic base.

Generally, the process for providing the elastomer surface on the fusing system member, e.g., donor roll, pressure roll, fuser roll, toner transfer belt or roller surfaces, and the like, includes forming a solvent solution/dispersion by mixing a fluoroelastomer dissolved in a solvent such as methyl ethyl ketone and methyl isobutyl ketone, a dehydrofluorinating agent such as a base, for example the basic metal oxides, MgO and/or $Ca(OH)_2$, and a nucleophilic curing agent such as VC-50 which incorporates an accelerator and a crosslinking agent, and coating the solvent solution/dispersion onto the substrate. The surface is then stepwise heat cured. Prior to the stepwise heat curing, ball milling is usually performed, for from 2 to 24 hours.

Curing can be considered important in the preparation of fluoroelastomers surfaces. The level of cure is important in that it affects the high temperature stability along with both chemical and physical properties of the elastomers. High temperature stability is of significance for fusing subsystem applications, whereas incomplete curing can adversely effect the transfer efficiencies of liquid and dry toners. Fluoroelastomers have been cured as set forth above, comprising the addition of dehydrofluorinating agents. The dehydrofluorinating agents create double bonds which provide crosslinking cites on the fluoroelastomer. Examples of curing agents include peroxides (for example, bis (2,4-dichlorobenzoyl) peroxide, di-benzoyl peroxide, di-cumyl peroxide, di-tertiary butyl peroxide, and 2,5-dimethyl-2,5-bis (t-butyl peroxy) hexane), diamines, hydrides, oxides, and the like. The preferred curing agents are the basic metal oxides (MgO and $Ca(OH)_2$) and aliphatic and aromatic amines, where the aromatic groups may be benzene, toluene, naphthalene, anthracene, and the like. The particularly preferred curing agents are the nucleophilic curing agents such as VC-50 which incorporates an accelerator (such as a quaternary phosphonium salt or salts) and a crosslinking agent (bisphenol AF). VC-50 is preferred due to the more thermally stable product it provides. The curative component can also be added after ball milling in a solution form. The resulting elastomer is provided on a substrate. Normally, step heat curing occurs next by heat curing at about 93° C. for 2 hours, followed by 2 hours at 149° C., 2 hours at 177° C. and 16 hours at 208° C.

Known curing processes require the addition of curing agents and crosslinking agents, in addition to dehydrofluorinating agents such as the basic metal oxides, MgO and $Ca(OH)_2$. These curing and crosslinking agents, along with the basic metal oxides, increase the cost of the curing process immensely. In addition, roll milling and/or ball milling are normally required in known curing procedures wherein basic metal oxides are used. Roll milling and/or ball milling can be an extremely costly and time consuming procedure, requiring anywhere from 2 to 24 hours to complete. In addition, the curing procedure is to be followed very carefully and in specific detail in order to form fluoroelastomers with sufficient chemical, physical and thermal stability, along with sufficient toughness.

Moreover, developer and/or toner resins, especially low melt toner resins, tend to react with the metal oxides present in the cured fluoroelastomer surface causing them to bind to the metal oxides. The result is that toner adheres to the surface of the fuser member, resulting in hot offset.

Therefore, a more cost effective and less time consuming method of providing a fluoroelastomer surface, which results in elastomers having sufficient toughness as well as sufficient chemical, physical, and thermal stability is desired. In addition, a method of providing a fluoroelastomer surface which decreases the adherence of toner to the surface is desired.

SUMMARY OF THE INVENTION

Examples of objects of the present invention include:

It is an object of the present invention to provide electophotographic components, especially fuser members, and methods with many of the advantages indicated herein.

It is another object of the present invention to provide a fuser member with a fluoroelastomer surface and a method for fusing thermoplastic resin toner images on a supporting substrate which does not require the use of additional coupling and crosslinking agents.

Yet another object of the present invention is to provide a fuser member with a fluoroelastomer surface and a method for fusing thermoplastic resin toner images on a supporting substrate which does not require the use of a curative which requires redispersing.

Still yet another object of the present invention is to provide a fuser member with a fluoroelastomer surface together with a method for fusing thermoplastic resin toner images on a supporting substrate which does not require time consuming and costly roll milling and/or ball milling.

In addition, an object of the present invention is to provide a fuser member with a fluoroelastomer surface together with a method for fusing thermoplastic resin toner images on a supporting substrate which does not require the use of costly metal oxides which can bind to toner resin, especially certain low melt toner resins such as polyester resins, causing hot offset.

It is further an object of the present invention to provide a fuser member with a fluoroelastomer surface which has sufficient chemical, physical and thermal stability, together with sufficient toughness.

Another object of the present invention is to provide a fuser member with a fluoroelastomer surface and a method for fusing thermoplastic resin toner images on a supporting substrate which is more cost effective than a number of known methods.

A further object of the present invention is to provide a fuser member with a fluoroelastomer surface and a method for fusing thermoplastic resin toner images on a supporting substrate which decreases the binding of toner resin to the fluoroelastomer surface.

Many of the above objects have been met by the present invention, in embodiments, which includes: a fuser member comprising a supporting substrate having an outer surface and wherein the outer surface is comprised of the reaction product of a fluoroelastomer and an amino silane.

Embodiments further include: a fuser member comprising a supporting substrate having an outer surface layer comprising a fluoroelastomer, and wherein the fluoroelastomer surface is prepared by: a) dissolving a fluoroelastomer; b) adding and reacting an amino silane; c) subsequently providing a surface layer of the resulting homogeneous fluoroelastomer solution to the supporting substrate.

Embodiments also include: a method for fusing thermoplastic resin toner images to a document substrate comprising: a) forming a film of a polymeric release agent having functional groups on the surface of a heated fuser member, wherein the fuser member comprises a supporting substrate having an outer surface layer comprising a fluoroelastomer, and wherein the fluoroelastomer surface is prepared by dissolving a fluoroelastomer, adding and reacting an amino silane to form a homogeneous fluoroelastomer, and subsequently providing a surface layer of the homogeneous fluoroelastomer solution to the supporting substrate, b) contacting toner images on the document substrate with the heated fluoroelastomer surface for a period of time sufficient to soften the toner, and c) allowing the toner to flow into the document substrate.

The fluoroelastomer surfaces and methods provided, the embodiments of which are further described herein, exhibit sufficient chemical, physical and thermal stability, along with sufficient toughness without the need for additional materials such as coupling and crosslinking agents, and basic metal oxides, and without the time consuming and costly roll milling and/or ball milling steps. In addition, the surfaces and methods provided, in embodiments, result in a decrease in toner resin adhering to the fuser member surfaces.

DETAILED DESCRIPTION OF THE PRESENT INVENTION

Figure 1:
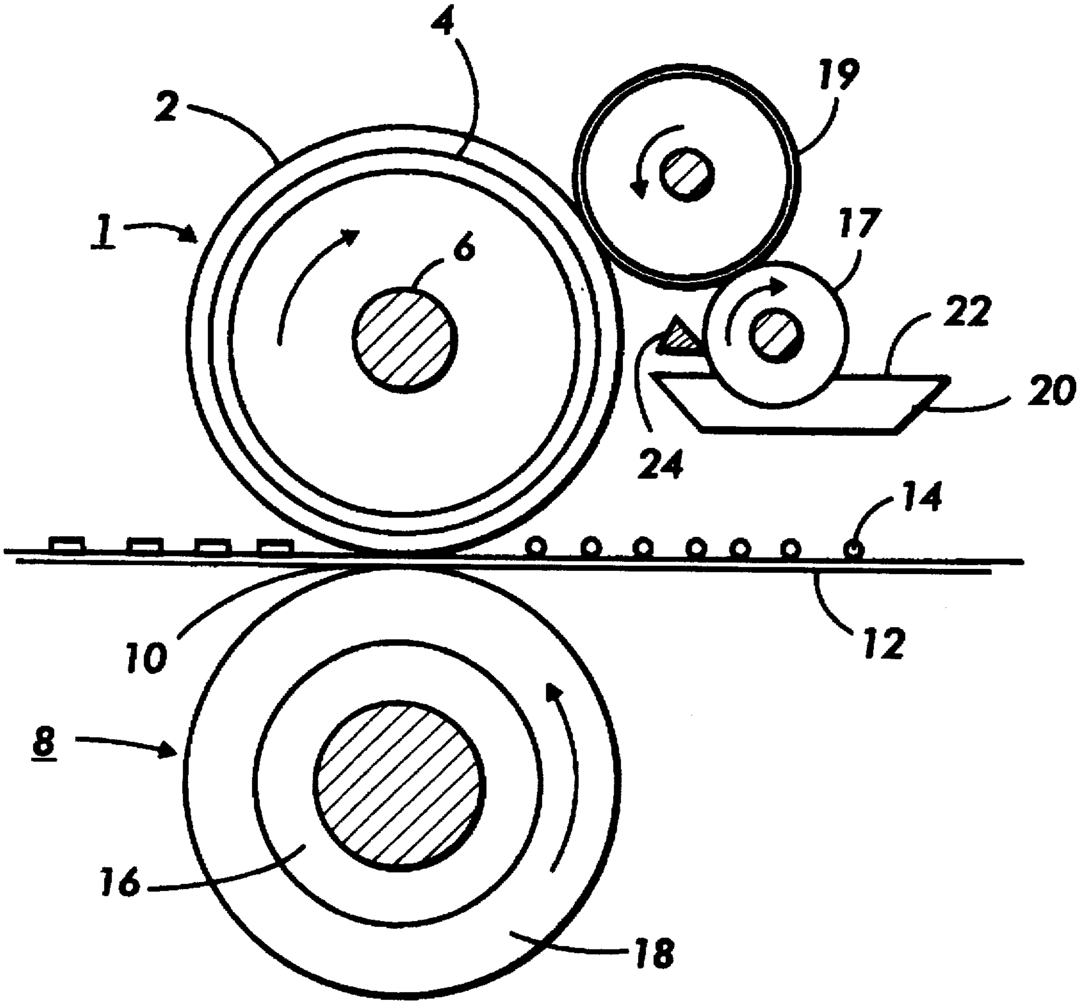
FIG. 1 represents a sectional view of a fuser system which may use the fuser member of the present invention.

A known fusing system is comprised of a heated cylindrical fuser roll having a fusing surface which is backed by a cylindrical pressure roll forming a fusing nip therebetween. A release agent donor roll is also provided to deliver release agent to the fuser roll. While the physical and performance characteristics of each of these rolls, and particularly of their functional surfaces, are not precisely the same depending on the various characteristics of the fusing system desired, the same classes of materials are typically used for one or more of the rolls in a fusing system in an electrostatographic image or printing system.

The present process, in embodiments, enables surfaces as described in conjunction with a fuser system assembly as shown in FIG. 1 where the numeral 1 designates a fuser roll comprising elastomer surface 2 upon a suitable base member 4, a hollow cylinder or core fabricated from any suitable metal, such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner images 14 thereon contact elastomer surface 2 of fuser roll 1. As shown in FIG. 1, the backup roll 8 has a rigid steel core 16 with an elastomer surface or layer 18 thereon. Sump 20 contains polymeric release agent 22 which may be a solid or liquid at room temperature, but it is a fluid at operating temperatures.

In the embodiment shown in FIG. 1 for applying the polymeric release agent 22 to elastomer surface 2, two release agent delivery rolls 17 and 19 rotatably mounted in the direction indicated are provided to transport release agent 22 to elastomer surface 2. Delivery roll 17 is partly immersed in the sump 20 and transports on its surface release agent from the sump to the delivery roll 19. By using a metering blade 24, a layer of polymeric release fluid can be applied initially to delivery roll 19 and subsequently to elastomer 2 in controlled thickness ranging from submicrometer thickness to thickness of several micrometers of release fluid. Thus, by metering device 24, about 0.1 to 2 micrometers or greater thicknesses of release fluid can be applied to the surface of elastomer 2.

Examples of the fluoroelastomers useful in the practice of the present invention are those described in detail in U.S. Pat. Nos. 5,166,031, 5,281,506, 5,366,772, 5,370,931, 4,257,699, 5,017,432 and 5,061,965, the disclosures of which are incorporated by reference herein in their entireties. As described therein these fluoroelastomers, particularly from the class of copolymers and terpolymers of vinylidenefluoride hexafluoropropylene and tetrafluoroethylene, are known commercially under various designations as VITON A®, VITON B®, VITON E®, VITON E60C®, VITON E430®, VITON 910®, VITON GH® and VITON GF®. The VITO® designation is a Trademark of E. I. Du Pont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS™ a poly(propylene-tetrafluoroethylene) and FLUOREL II® (LII900) a poly (propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, TN505® available from Montedison Specialty Chemical Company. Some VITON compositions contain small amounts of a bromine terminated olefin as a cure site monomer. This allows for curing with dinucleophiles or peroxides.

In a preferred embodiment, the fluoroelastomer is one having a relatively low quantity of vinylidenefluoride, such as in VITON GF®, available from E. I. Du Pont de Nemours, Inc. The VITON GF® contains 35 weight percent of vinylidenefluoride, 34 weight percent of hexafluoropropylene and 29 weight percent of tetrafluoroethylene with 2 weight percent cure site monomer. The amount of fluoroelastomer used to provide the surface of the present invention is dependent on the amount necessary to form the desired thickness of the layer or layers of surface material. Specifically, the fluoroelastomer is added in an mount of from about 1 to about 75 percent, and preferably about 5 to about 30 percent by weight.

Any known solvent suitable for dissolving a fluoroelastomer may be used in the present invention. Examples of suitable solvents include methyl ethyl ketone, methyl isobutyl ketone, other organic solvents and the like. The solvent is used in an amount sufficient to dissolve the fluoroelastomer. Specifically, the solvent is added in an amount of from about 25 to about 99 percent, and preferably from about 70 to about 95 percent. The fluoroelastomer is dissolved in the solvent by known means such as by stirring. It is preferred to stir the mixture vigorously by hand or by using a mechanical stirrer. The stirring should continue for from about 1 to about 10 hours, and preferably from about 2 to about 5 hours.

The dehydrofluorinating agent which attacks the fluoroelastomer generating unsaturation is selected from the group of strong nucleophilic agents such as peroxides, hydrides, bases, oxides, amines and the like. Examples of strong nucleophilic agents include primary, secondary and tertiary, aliphatic and aromatic amines, where the aliphatic and aromatic amines have from about 2 to about 15 carbon atoms. Also included are aliphatic and aromatic diamines having from about 6 to about 30 carbon atoms, and triamines containing from about 2 to about 15 carbon atoms where the aromatic groups may be benzene, toluene, naphthalene, anthracene, and the like. It is generally preferred for the aromatic diamines and triamines that the aromatic group be substituted in the ortho, meta and para positions. Typical substituents include lower alkyl amino groups having from about 1 to about 6 carbons, such as ethylamino, propylamino and butylamino with propylamino being preferred.

The amino silane as a curative and/or a dehydrofluorinating agent is present in the reaction mixture, in embodiments, in an effective amount of, for example, from about 0.5 to about 10 percent (weight percent) based on the weight of fluoroelastomer. It is preferable that the amino silane be present in an amount of from about 1 to about 5 percent. Specifically preferred amounts are from about 1 to about 2 percent.

In a preferred embodiment, the amino silane can be used as the dehydrofluorinating agent at the beginning of the process for providing a fluoroelastomer surface, and no additional curing agent is necessary. The amino silane will act as a dehydrofluorinating agent, in addition to the curing agent. Alternatively, a dehydrofluorinating agent can be added, and the fluoroelastomer cured by the amino silane as the curing agent. The dehydrofluorinating agent can be as listed above, or an amino silane.

Although the mechanism of reaction with the amino silane is not exactly known, it is believed that the amino compounds act as both a crosslinker and a coupler. Therefore, there is no need for additional couplers, crosslinkers and basic metal oxides to be added during the curing process. Specifically, the amino silane is an aminoalkyl functional silane, and has an amine functionality at one end and trialkoxysilane at the other. The dual functionality of the amino silane suggests that the amine is chemically bonded to fluoropolymer, allowing the trialkyl silane functionality to bring about a condensation reaction between fluoropolymer molecules under certain conditions. In contrast, the most probable mechanism for VC-50 and other known curatives is that the crosslinking of fluoropolymer chains occurs through a single reactive functionality.

Specifically, the amino silane is of the general formula $NH_2(CH_2)_nNH_2(CH_2)_mSi((OR)_t(R')_w)$ wherein n and m are numbers from about 1 to about 20, and preferably from about 2 to about 6; t+w=3; R and R' are the same or different and are an aliphatic group of from about 1 to about 20 carbon atoms, such as methyl, ethyl, propyl, butyl, and the like, or an aromatic group of from about 6 to about 18 carbons, for example, benzene, tolyl, xylyl, and the like. Examples of amino silanes include 4-aminobutyldimethyl methoxysilane, 4-aminobutyl triethoxysilane, (aminoethylaminomethyl) phenyl triethoxysilane, N-(2-aminoethyl)-3-aminopropylmethyl dimethoxysilane, N-(2-aminoethyl)-3-aminopropyl trimethoxysilane, N-(2-aminoethyl)-3-aminopropyl tris(2-ethyl-hexoxy)silane, N-(6-aminohexyl) aminopropyl-trimethoxysilane, 3-(1-aminopropoxy)-3,3-dimethyl-1-propenyl-trimethoxysilane, 3-aminopropyl tris (methoxyethoxyethoxy)-silane, 3-aminopropyldimethyl ethoxysilane, 3-aminopropylmethyl diethoxysilane, 3-aminopropyl diisopropylethoxysilane, 3-aminopropyl triethoxysilane, 3-aminopropyl trimethoxysilane, or 3-aminopropyltris (trimethylsiloxy)silane. Particularly preferred amino silanes are AO700 (N-(2-aminoethyl)-3-aminopropyl trimethoxysilane), 3-(N-styrylmethyl-2-aminoethyl aminopropyl) trimethoxy silane, sold in its hydrochloride form, and (aminoethyl aminomethyl) phenyl trimethoxy silane all manufactured by Huls of America, Inc.

Other adjuvants and fillers may be incorporated in the elastomer in accordance with the present invention provided that they do not adversely effect the integrity of the fluoroelastomer. Such fillers normally encountered in the compounding of elastomers include coloring agents, reinforcing fillers, and processing aids. Oxides such as copper oxides may be added in certain amounts such as, for example, from about 1 to about 10 volume percent, to fuser roll coatings to provide sufficient anchoring sites for functional release oils, and thereby allow excellent toner release characteristics from such members.

The substrate for the fuser member of the fuser system assembly may be a roll, belt, flat surface or other suitable shape used in the fixing of thermoplastic toner images to a suitable substrate. It may take the form of a fuser member, a pressure member or a release agent donor member, preferably in the form of a cylindrical roll. Typically, the substrate takes the form of a cylindrical tube of aluminum, copper, steel or certain plastic materials chosen to maintain rigidity, structural integrity, as well as being capable of having the fluoroelastomer coated thereon and adhered firmly thereto. The diameter of the substrate is from about 10 to about 100 mm, and preferably from about 40 to about 75 mm. It is preferred that the supporting substrate is a cylindrical sleeve having an outer layer of from about 1 to about 6 mm. In one embodiment, the core which may be a steel cylinder is degreased with a solvent and cleaned with an abrasive cleaner prior to being primed with a primer, such as Dow Corning 1200, which may be sprayed, brushed or dipped, followed by air drying under ambient conditions for thirty minutes and then baked at 150° C. for 30 minutes.

Optional intermediate adhesive layers and/or elastomer layers may be applied to achieve certain desired properties and performance objectives of the present invention. There may be one or more, and preferably up to 10 intermediate layers between the substrate and the outer layer of cured fluoroelastomer if desired. The thickness of the intermediate layer(s) is, for example, from about 0.5 to about 20 mm, and preferably from about 1 to about 5 mm. Typical materials having the appropriate thermal and mechanical properties for such layers include silicone elastomers, fluoroelastomers and TEFLON® PFA sleeved EPDM (ethylene propylene diene monomer) rollers. Preferred intermediate layers include elastomer layers and adhesive layers. An adhesive layer may be selected from a polymeric compound selected from epoxy resins and silanes, for example, epoxy resins, polysilanes and polysiloxanes. Preferred adhesives are proprietary materials such as THIXON 403/404, Union Carbide A-1100, Dow TACTIX 740, Dow TACTIX 741, and Dow TACTIX 742. A particularly preferred curative for the aforementioned adhesives is Dow H41. Preferred elastomer layers comprise a haloelastomer or a silicone elastomer. The thickness of the intermediate layer is from about 0.5 to about 20 mm, preferably from about 1 to about 5 mm.

A silicone elastomer intermediate layer may be applied according to conventional techniques such as injection molding and casting after which it is cured for up to 15 minutes and at 120° to 180° C. to provide a complete cure without a significant post cure operation. This curing operation should be substantially complete to prevent debonding of the silicone elastomer from the core when it is removed from the mold. Thereafter, the surface of the silicone elastomer is sanded to remove the mold release agent and it is wiped clean with a solvent such as isopropyl alcohol to remove all debris. The intermediate layer can also be prepared from fluoroelastomers like VITON GF®, wherein a typical composition is prepared, for example, by adding 30 parts of carbon black like REGAL N991® per 100 parts of VITON GF®, followed by rubber mixing in a Banbury mixer and, thereafter, injection molded onto a metal core. Alternatively, the intermediate layer may be formed in accordance with the present invention.

The outer layer of the fuser member is preferably prepared by dissolving the fluoroelastomer in a typical solvent, such as methyl ethyl ketone, methyl isobutyl ketone and the like. A nucleophilic dehydrofluorinating agent, preferably amino silane, is then added, followed by stirring for 15 to 60 minutes at 45° to 85° C. The resulting solution is then used to fabricate the outer layer of a fuser member by conventional solution coating methods spraying, dipping, flow coating, or the like. The coating thickness can vary depending upon specific applications from about 10 to about 250 micrometers thick. The coating is first air dried and then step heat cured in air. For fuser application, the thickness of the dry fluoroelastomer layer could be any suitable thickness, for example, from about 25 to about 75 micrometers, and preferably from about 35 to about 50 micrometers. This thickness range is selected to provide a layer thin enough to prevent a large thermal barrier for fusing and thick enough to allow a reasonable wear life. While molding, extruding and wrapping techniques are alternative means which may be used, it is preferred to spray or flow-coat successive applications of the solvent solution. When the desired thickness of coating is obtained, the coating is cured and thereby bonded to the roll surface.

The curing time is, for example, from about 30 minutes to about 24 hours, and preferred is from about 1 to about 4 hours, and particularly preferred is from about 1 to about 2 hours. The temperature for curing is from about 100 to about 150° C., and preferably from about 130 to about 150° C.

The surfaces, in embodiments, do not contain basic metal oxides which tend to bind to developer and/or toner resins, causing build up of toner on the fuser member surface, which causes hot offset, and in turn, results in poor copy quality including toner smudges on the copy substrate, incomplete transfer of images, shorter fuser roll release life, and the like. Since the described method of curing uses amino silane as the curing agent, the basic metal oxides are not necessary.

Resins which have a tendency to bind to fuser member surfaces which contain metal oxides in the final surface product include polyester resins, and also toners comprised of low melt resin particles such as unsaturated polyesters. Specific examples include SPAR which is a polymeric esterification product of a dicarboxylic acid and a diol comprising a diphenol. A SPAR resin is described in U.S. Pat. No. 3,590,000 to Palermiti et al, the disclosure of which is herein incorporated by reference in its entirety. Other examples of toners comprising low melt resins include those illustrated in U.S. Pat. Nos. 5,277,460; 5,376,494; 5,401,602 and 5,324,611, the disclosures of which are herein incorporated by reference in their entirety. The binding of the resins with the fuser member surface occurs either by direct reaction with a metal such as Mg or Ca, or by cleavage of the double bonds present in the resin by a basic metal oxides such as $Ca(OH)_2$ and/or MgO. In embodiments, the invention surfaces are formed by a method which dispenses with the need for strongly basic containing compounds such as $Ca(OH)_2$ and/or MgO, and all ionic metals. Therefore, the resin does not have any metal oxides or ionic metals to bind to. The result is a surface which continues with a slower rate of build up of toner and/or developer resin, and copy substrates which have a decrease in toner images.

The present invention greatly reduces the cost and time associated with providing a fluoroelastomer surface on a supporting substrate. Specifically, the present invention dispenses with the additional costs associated with materials which were previously necessary to effect curing, such as the coupling and crosslinking agents and basic metal oxides. The amino silane functions as both the dehydrofluorinating agent and the curing agent. In addition, a significant cost associated with the curing process is the roll milling or final ball milling step. By dispensing with the need for the roll milling or final ball milling step, the present invention saves time as well as expense. The unit manufacturing costs can be reduced substantially with embodiments of the present invention.

In addition to cost reduction and time savings, with embodiments of the present invention there is provided a fluoroelastomer surface with sufficient chemical, physical and thermal stability, and increased toughness. Moreover, there is a decrease in toner and/or developer resin build-up on the fuser member surface due to the lack of metal ions and/or metal oxides in the final fuser member surface.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1

Preparation of fuser roll from Viton GF cured with aminosilane and VC-50

A solution was prepared by dissolving 2,500 grams of Viton GF in 25 liters of a 3:1 mixture of methylethyl ketone (MEK) and methylisobutylketone (MIBK), by stirring at room temperature (25° C.). This is accomplished by vigorous stirring using a mechanical stirrer. It takes approximately two to four hours to accomplish the dissolution depending upon the intensity of stirring. The resulting solution was then used as stock solution to prepare fuser roll coatings. Two 1,000 gram portions were taken from the above solution. An amount of 1,000 grams of the above solution to be cured by VC-50 (Part A), was added to a milling jar with milling media. In addition, 5 grams of DuPont Curative VC-50 catalyst crosslinker in 45 grams of methyl ethyl ketone, 2.2 grams of calcium hydroxide, and 4.4 grams of magnesium oxide were added to the above jar. The contents of the jar were then ball milled for 17 to 24 hours. This dispersion was labeled as Part A and was later used to fabricate fuser rolls.

To the second 1,000 gram portion of Viton GF from above to be cured with AO700 (Part B), 2 grams of N(2-aminoethyl-3 aminopropyl)-trimethoxy silane (AO700, available from Huls of America, Inc., Piscataway, N.J.), was added. The solution was mixed for about two minutes with the assistance of a mechanical stirrer and was then used to fabricate fuser rolls. This solution was labeled Part B.

Fabrication of fuser rolls and fixture testing

Both Part A and Part B were used as dispersions to fabricate fuser roll surfaces by conventional spray or flow coating methods. A thermally conductive silicone layer was compression or transferred molded over a hollow aluminum core with an outside diameter of 48 mm. After the conductive silicone layer was crosslinked, it was ground to a thickness of 1.25 mm. On top of this layer, individual rolls were flowcoated using either Part A or Part B dispersions followed by curing the rolls using the standard step heat curing procedure, 2 hours at 93° C., 2 hours at 149° C., 2 hours at 177° C., and 16 hours at 208° C.

A toner release test was conducted in the following manner: a copy paper carrying unfused toner images was fed through the fuser roll, (of a xerographic test fixture like the Xerox Corporation 5090), having either Part A or Part B dispersion as the means of forming the release layer, and a steel pressure roll. The toner which was transferred to the copy paper was made from a crosslinked SPAR resin containing 0.3 weight percent zinc stearate without a charge control agent.

TABLE I

Fuser Roll Release Life of Viton GF Materials

| | Part A: | Part B: |
|---|---|---|
| | Viton GF cured with VC-50 and basic metal oxides | Viton GF cured with A0700 |
| Crosslinked SPAR with 0.3 wt. percent Zinc stearate and no charge control agent | 55K copies | 251K copies |

The above evidences that the roll from Part B had an unexpectedly superior release performance than the roll from Part A. These results tend to indicate that the presence of the metal oxides was causing an increase in toner adherence to the fuser roll surface and thus shorting its release life.

While the invention has been described in detail with reference to specific and preferred embodiments, it will be appreciated that various modifications and variations will be apparent to the artisan. All such modifications and embodiments that may occur to one skilled in the art are intended to be within the scope of the appended claims.

We claim:

1. A fuser system member comprising a supporting substrate and an outer surface layer consisting essentially of a reaction product of a dissolved fluoroelastomer and an amino silane.

2. A fuser system member comprising a supporting substrate and an outer surface layer consisting essentially of a reaction product of a fluoroelastomer and an amino silane, wherein the amino silane content is from about 0.5 to about 10 percent by weight based on the weight of said fluoroelastomer.

3. A fuser system member in accordance with claim 1, wherein the supporting substrate is a fuser roll, a pressure roll, or a release agent donor roll.

4. A fuser system member in accordance with claim 1, wherein the supporting substrate is cylindrical sleeve, a drum, a belt, or an endless belt.

5. A fuser system member in accordance with claim 1, wherein the supporting substrate is comprised of a material selected from the group consisting of aluminum, copper, and steel.

6. A fuser system member in accordance with claim 1, further comprising from about 1 to about 10 intermediate layers situated between the supporting substrate and the outer surface layer.

7. A fuser system member in accordance with claim 6, wherein at least one of the intermediate layers is an elastomer layer or an adhesive layer.

8. A fuser system member in accordance with claim 7, wherein the intermediate elastomer layer comprises a silicone elastomer.

9. A fuser system member in accordance with claim 7, wherein the adhesive layer comprises a polymeric compound selected from the group consisting of epoxy resins and silanes.

10. A fuser system member in accordance with claim 1, wherein the outer surface layer is from about 25 to about 75 micrometers in thickness.

11. A fuser system member in accordance with claim 1, wherein the amino silane is of the formula $NH_2(CH_2)_nNH(CH_2)_mSi((OR)_t(R')_w)$, wherein n and m are numbers of from about 1 to about 20; t+w=3 and R and R' are an aliphatic hydrocarbon having from about 1 to about 20 carbon atoms or an aromatic group having from about 6 to about 18 carbon atoms.

12. A fuser system member in accordance with claim 11, wherein the amino silane is selected from the group consisting of N-(2-aminoethyl-3-aminopropyl)-trimethoxy silane, [(3-(N-strylmethyl-2-aminoethylamino) propyltrimethoxy silane hydrochloride and (aminoethylamino methyl) phenethytrimethoxy] 3-(N-styrylmethyl-2-aminoethyl aminopropyl) trimethoxy silane, (aminoethyl aminomethyl) phenyl trimethoxy silane, and (aminoethyl aminomethyl) phenyl triethoxy silane.

13. A fuser system member in accordance with claim 2, wherein the amount of amino silane is from about 1 to about 5 weight percent.

14. A fuser system member in accordance with claim 13, wherein the amount of amino silane is from about 1 to about 2 weight percent.

15. A fuser system member in accordance with claim 1, wherein the fluoroelastomer is selected from the group consisting of (1) a class of copolymers of vinylidenefluoride and hexafluoropropylene and (2) a class of terpolymers of vinylidenefluoride, hexafluoropropylene and tetrafluoroethylene.

16. A fuser system member in accordance with claim 1, wherein the fluoroelastomer comprises 35 weight percent of vinylidenefluoride, 34 weight percent of hexafluoropropylene and 29 weight percent of tetrafluoroethylene.

17. A fuser system member comprising a supporting substrate and an outer surface layer compound consisting essentially of a reaction product of a dissolved fluoroelastomer and from about 0.5 to about 10 weight percent based on the weight of said fluoroelastomer of an amino silane having the formula $NH_2(CH_2)_nNH(CH_2)_mSi[(OR)_t(R')_w]$, wherein n and m are from about 1 to about 20; t+w=3; and R and R' are an aliphatic hydrocarbon chain with from about 1 to about 20 carbon atoms or an aromatic group with from about 6 to about 24 carbons.

* * * * *